US010668897B2

(12) United States Patent
Gallegos de la Pena et al.

(10) Patent No.: US 10,668,897 B2
(45) Date of Patent: Jun. 2, 2020

(54) WINDSCREEN WIPER DEVICE

(71) Applicant: Federal-Mogul Motorparts LLC, Southfield, MI (US)

(72) Inventors: Miguel Angel Gallegos de la Pena, Chih. (MX); Jesus Yee, El Paso, TX (US); David Reyes Lopez, Chih. (MX); Miguel Gutierrez, Chih. (MX)

(73) Assignee: Trico Products Corporation, Farmington Hills, MI (US)

( * ) Notice: Subject to any disclaimer, the term of this patent is extended or adjusted under 35 U.S.C. 154(b) by 0 days.

(21) Appl. No.: 15/802,750

(22) Filed: Nov. 3, 2017

(65) Prior Publication Data
US 2018/0126958 A1    May 10, 2018

Related U.S. Application Data

(60) Provisional application No. 62/419,099, filed on Nov. 8, 2016.

(51) Int. Cl.
*B60S 1/40* (2006.01)
*B60S 1/38* (2006.01)

(52) U.S. Cl.
CPC .......... *B60S 1/4019* (2013.01); *B60S 1/3853* (2013.01); *B60S 1/3858* (2013.01); *B60S 1/387* (2013.01); *B60S 1/3879* (2013.01); *B60S 2001/382* (2013.01); *B60S 2001/3898* (2013.01)

(58) Field of Classification Search
CPC .... B60S 1/3851; B60S 1/3858; B60S 1/3874; B60S 1/3853; B60S 1/3879; B60S 1/3849; B60S 1/3875; B60S 2001/382; B60S 1/387

USPC .......... 15/250.43, 250.44, 250.451, 250.201, 15/250.361
See application file for complete search history.

(56) References Cited

U.S. PATENT DOCUMENTS 3,006,018 A  * 10/1961  Golab ................... B60S 1/3801
                                                  15/250.43
3,141,186 A      7/1964  Scinta
3,616,485 A  * 11/1971  Quinlan et al. ....... B60S 1/3801
                                                  15/250.454

(Continued)

FOREIGN PATENT DOCUMENTS

DE              3208749     * 10/1982
DE     102006050815 A1       4/2008

(Continued)

OTHER PUBLICATIONS

Machine translation of description portion of WO publication 2005/025956, published Mar. 2005. (Year: 2005).*

(Continued)

*Primary Examiner* — Gary K. Graham
(74) *Attorney, Agent, or Firm* — Miller Canfield (57) ABSTRACT

The windscreen wiper device includes an elastomeric wiper blade that extends in a longitudinal direction. At least one pre-curved longitudinal strip is operably attached with the wiper blade and biases the wiper blade into a curved shape. A connecting device is secured with the at least one strip. The at least one strip includes a pair of tabs that extend longitudinally towards one another and project vertically. The tabs cooperate with the connecting device to secure the connecting device with the at least one longitudinal strip.

8 Claims, 6 Drawing Sheets

(56) References Cited

U.S. PATENT DOCUMENTS

| | | | |
|---|---|---|---|
| 3,768,113 | A | 10/1973 | Kolb |
| 3,899,800 | A * | 8/1975 | Wittwer ................ B60S 1/3801 15/250.44 |
| 4,782,549 | A | 11/1988 | Beneteau et al. |
| 4,796,326 | A | 1/1989 | Beneteau et al. |
| 5,697,156 | A | 12/1997 | Buechele |
| 5,964,025 | A | 10/1999 | Buechele |
| 6,185,805 | B1 | 2/2001 | Rosiere et al. |
| 7,159,269 | B2 | 1/2007 | Lee |
| 7,690,116 | B2 | 4/2010 | Lee |
| 7,748,076 | B2 | 7/2010 | Weiler et al. |
| 8,196,256 | B2 | 6/2012 | Lee |
| 8,307,493 | B2 | 11/2012 | Boland |
| 8,448,290 | B2 | 5/2013 | Op't Roodt et al. |
| 8,826,485 | B2 * | 9/2014 | Boland ................ B60S 1/3808 15/250.201 |
| 9,481,342 | B2 | 11/2016 | Acx et al. |
| 2002/0050019 | A1 | 5/2002 | Orjela et al. |
| 2006/0207050 | A1 * | 9/2006 | Shanmugham ......... B60S 1/381 15/250.43 |
| 2010/0275403 | A1 | 11/2010 | Jollec |
| 2014/0075708 | A1 | 3/2014 | Crabbe |

FOREIGN PATENT DOCUMENTS

| | | |
|---|---|---|
| DE | 102011004632 A1 | 8/2012 |
| DE | 102012210204 A1 | 12/2013 |
| EP | 1745997 A1 | 1/2007 |
| WO | 2005025956 A1 | 3/2005 |

OTHER PUBLICATIONS

International Search Report, dated Jan. 17, 2018 (PCT/US2017/060517).

* cited by examiner

WINDSCREEN WIPER DEVICE

CROSS-REFERENCE TO RELATED APPLICATION

This application claims of the benefit of U.S. Provisional Patent Application Ser. No. 62/419,099, filed Nov. 8, 2016, entitled "Windscreen Wiper Device", the entire disclosure of the application being considered part of the disclosure of this application and hereby incorporated by reference.

BACKGROUND OF THE INVENTION

1. Field of the Invention

The present invention is related generally to windscreen wiper devices and, more particularly, to the connecting devices of windscreen wiper devices.

2. Related Art

Windscreen wiper devices typically fall into one of three basic categories: conventional, beam and hybrid. Conventional blades utilize a frame structure which consists of a system of yokes arranged in a tournament-style construction to distribute a biasing force from an oscillating wiper arm across a length of an elastomeric wiper blade. Beam blades utilize a carrier element, which typically includes one or more longitudinal strips of spring steel, to distribute the biasing force along the length of the wiper strip. Hybrid blades typically include both a frame structure and a carrier element to distribute the biasing force from the wiper arm.

In beam blades, a connecting device is attached directly to the carrier element. In some cases, the connecting device is glued/bonded with the carrier element, and in others, the connecting device is ultrasonically welded with the carrier element.

SUMMARY OF THE INVENTION AND ADVANTAGES

One aspect of the present invention is related to a windscreen wiper device which includes an elastomeric wiper blade that extends in a longitudinal direction. At least one pre-curved longitudinal strip is operably attached with the wiper blade and biases the wiper blade into a curved shape. A connecting device is secured with the at least one strip. The at least one strip includes a pair of tabs that extend longitudinally towards one another and project vertically. The tabs cooperate with the connecting device to secure the connecting device with the at least one longitudinal strip.

According to another aspect of the present invention, the tabs are bent upwardly from a surrounding portion of the at least one longitudinal strip.

According to yet another aspect of the present invention, the connecting device includes a base with a pair of notches that receive the tabs of the at least one longitudinal strip.

According to still another aspect of the present invention, the notches are formed on an arm that wraps around the at least one longitudinal strip such that the base is non-detachable from the at least one longitudinal strip.

According to a further aspect of the present invention, the tabs are partially delimited by cuts in the at least one longitudinal strip.

According to yet a further aspect of the present invention, the at least one longitudinal strip is a pair of longitudinal strips that are received in laterally outwardly facing grooves on the wiper blade.

According to still a further aspect of the present invention, each of the longitudinal strips has a pair of tabs that extend longitudinally towards one another.

According to another aspect of the present invention, the longitudinal strips have opposing lateral edges and the tabs are formed into the opposing lateral edges.

According to yet another aspect of the present invention, the connecting device includes a base which is secured with the tabs of the at least one longitudinal strip and includes a joint part which is pivotably connected with the base.

Another aspect of the present invention is related a method of making a windscreen wiper device. The method includes the step of preparing at least one longitudinal strip that is pre-curved to have a curved shape when in a relaxed condition and that extends in a longitudinal direction between opposite longitudinal ends. The method continues with the step of cutting the at least one longitudinal strip to present a pair of tabs which extend in the longitudinal direction towards one another. The method proceeds with the step of operably connecting the at least one longitudinal strip with a wiper blade that is made of an elastomeric material to bias the wiper blade into a curved shape. The method continues with the step of sliding a component of a connecting device onto the at least one longitudinal strip from one of the longitudinal ends until the component contacts one of the tabs of the pair of tabs. The method proceeds with the step of snappingly engaging the other tab of the pair of tabs into engagement with the component of the connecting device to lockingly connect the component of the connecting device with the at least one longitudinal strip.

According to another aspect of the present invention, the method includes the step of resiliently deflecting one of the tabs of the pair of tabs during the step of sliding the component of the connecting device onto the at least one longitudinal strip.

According to yet another aspect of the present invention, the component has a pair of notches that receive the pair of tabs when the at least one longitudinal strip is lockingly connected with the component of the connecting device.

According to still another aspect of the present invention, the notches are formed into an arm of the connecting device that wraps around the at least one longitudinal strip such that the tabs are inaccessible after the component of the connecting device is lockingly connected with the at least one longitudinal strip.

According to a further aspect of the present invention, the component of the connecting device is a base.

According to yet a further aspect of the present invention, the method further includes the step of pivotably attaching a joint part with the base of the connecting device.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DETAILED DESCRIPTION OF THE ENABLING EMBODIMENT

Figure 1:
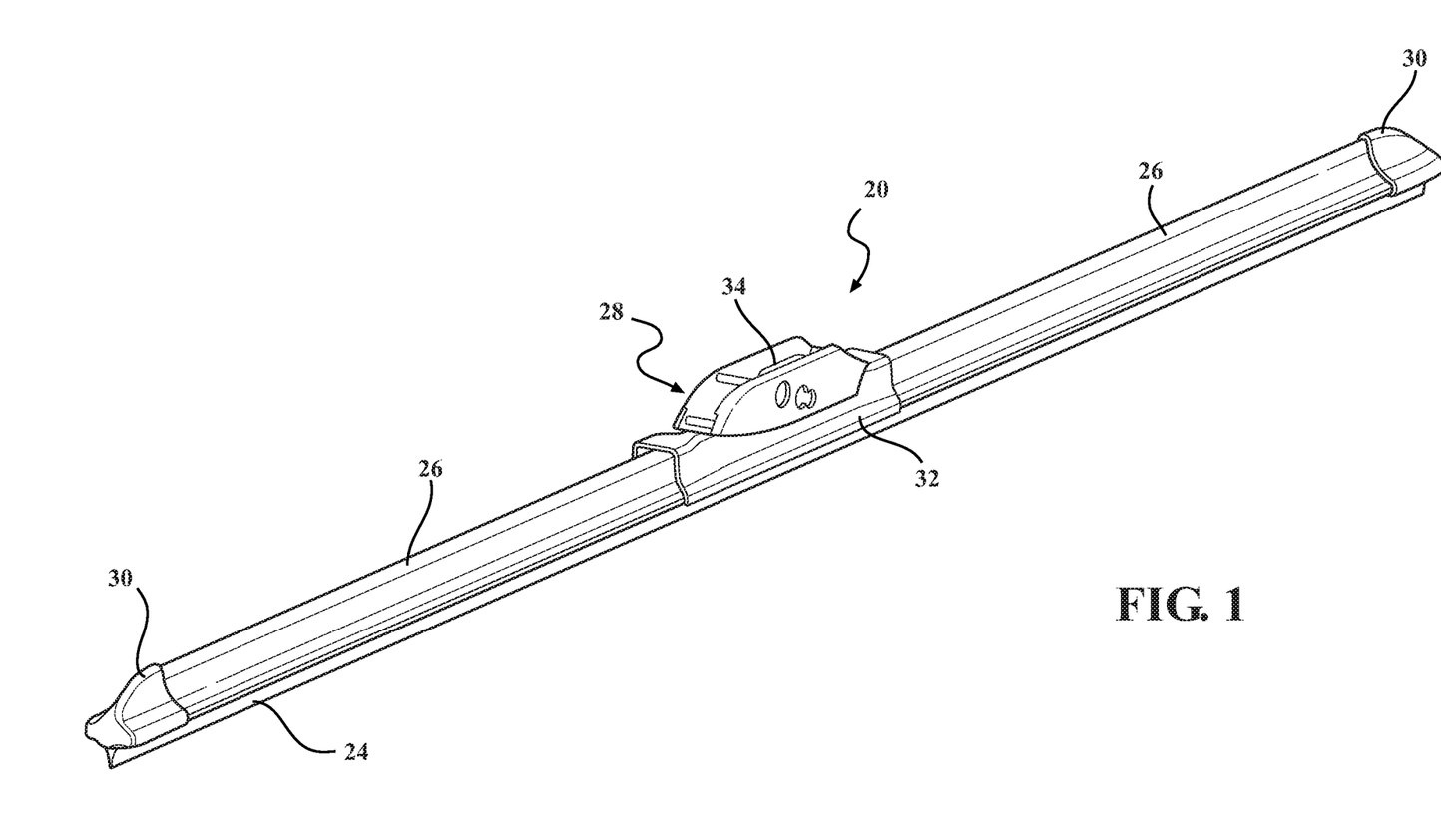
FIG. 1 is a perspective view of an exemplary wiper device constructed according to one aspect of the present invention.

Referring to the Figures, wherein like numerals indicate corresponding parts throughout the several views, an exemplary embodiment of an improved windscreen wiper device 20 is generally shown in FIG. 1. The windscreen wiper device 20 has a beam-style construction in that it includes a longitudinally extending carrier element 22 (shown in FIG. 2) which is pre-shaped to bias an elastomeric wiper blade 24 (also known as a wiper strip or a wiping element) into a curved shape, which allows an entire length of the wiper strip 24 to seal against a curved windshield (not shown) of a vehicle. That is, in the exemplary windscreen wiper device 20, the carrier element 22, rather than a series of yokes, distributes a force from an oscillating wiper arm (not shown) along the length of the wiper blade 24 to seal the wiper blade against the windshield. The exemplary windscreen wiper device 20 also includes a pair of sub-spoilers 26, which are made as separate pieces from one another and are attached with the carrier element 22, for imparting a downforce on the wiper strip 24 when the vehicle is travelling at speed to improve the seal between the wiper blade 24 and the windshield. A connecting device 28 is engaged with the carrier element 22 at approximately a longitudinal midpoint of the carrier element 22 for lockingly connecting the windscreen wiper device 20 with an oscillating wiper arm (not shown). A pair of end caps 30 are engaged with opposite ends of the carrier element 22 for retaining the sub-spoilers 26 on the carrier element 22 between the connecting device 28 and the end caps 30.

Figures 2, 3:
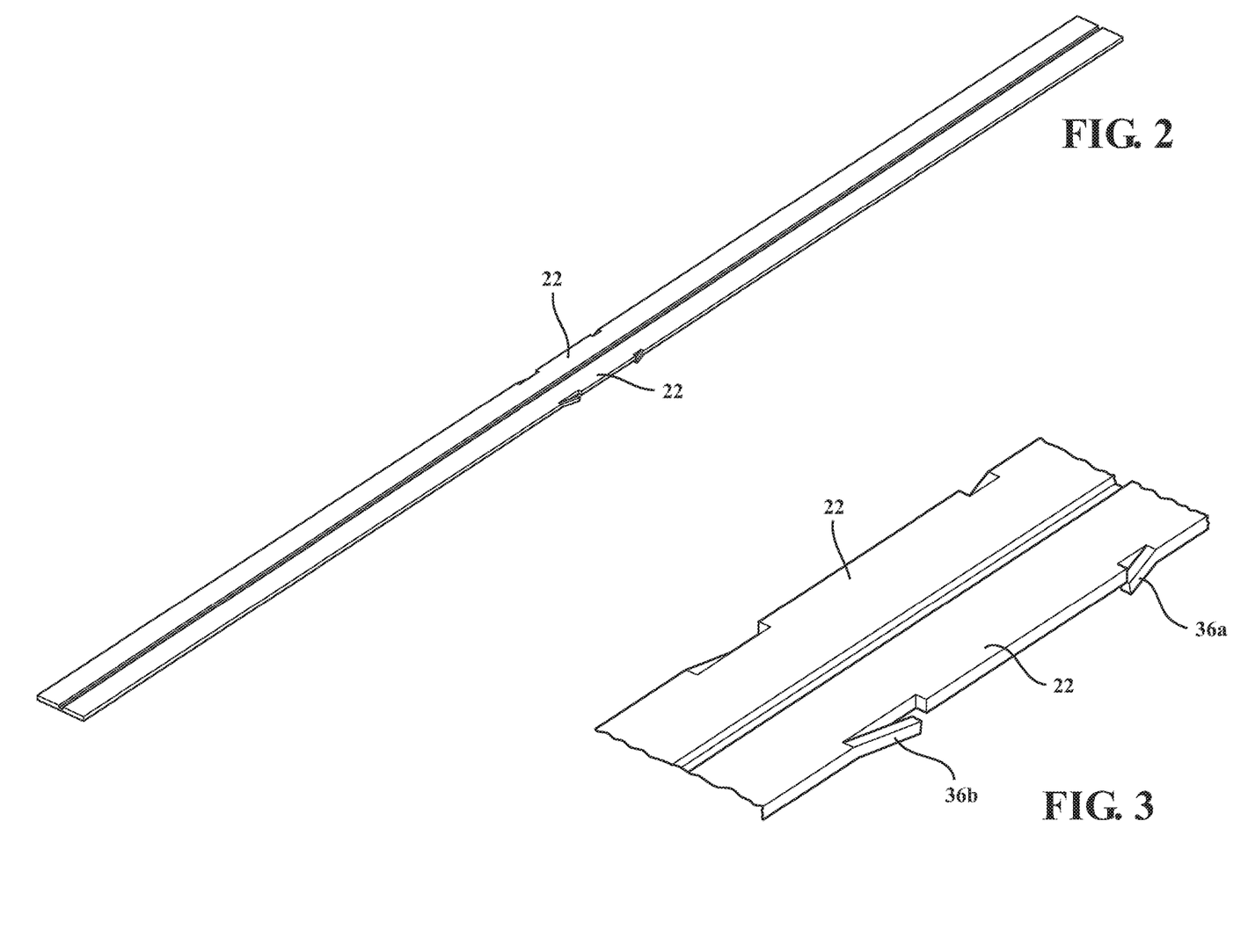
FIG. 2 is a perspective view of a carrier element of the wiper device of FIG. 1 before assembly.
FIG. 3 is an enlarged view of a portion of the carrier element of FIG. 2 and showing the carrier element being cut and bent to present two pairs of tabs.
Figure 4:
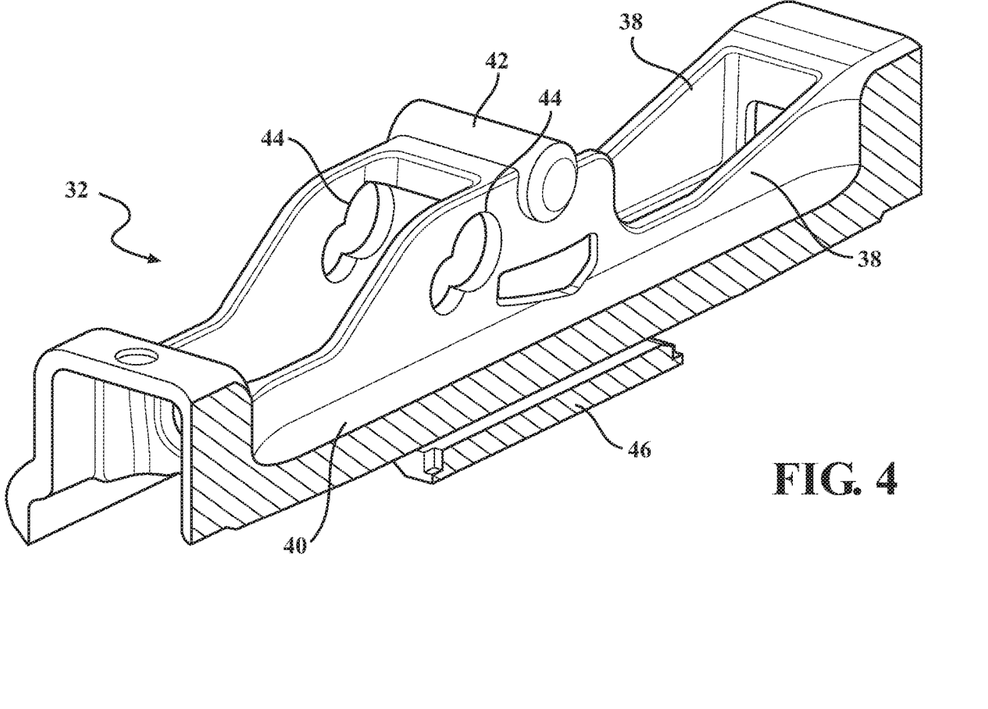
FIG. 4 is a perspective and sectional view of a base of a connecting device from the wiper device of FIG. 1.

As shown in FIGS. 2 and 3, in the exemplary embodiment, the carrier element 22 includes a pair of longitudinal strips 22 that are made of spring steel and that are received in longitudinally extending grooves of the wiper strip 24. However, it should be appreciated that the carrier element 22 could take other forms, e.g., the carrier element could be a single longitudinal strip that is glued to the wiper strip or it could be a single longitudinal strip that is received within a single longitudinal groove of a one-piece wiper strip and spoiler.

The connecting device 28 includes a base 32, which is fixedly engaged with the carrier element 22, and includes a joint part 34 that is shaped to lockingly connect with at least one style of oscillating wiper arm (not shown). The joint part 34 is pivotably connected with the base 32 by receiving circular protrusions on the base 32 into circular openings in the joint part 34. This allows the joint part 34 and wiper arm to pivot or rotate relative to the base 32 and the rest of the wiper device 20 during attachment and detachment procedures. The joint part 34 may take a range of different forms and configurations for connecting the windscreen wiper device 20 with types or styles of oscillating wiper arms including, for example, bayonet-style wiper arms, hook-style wiper arms, top lock-style wiper arms, side pin-style wiper arms, etc.

FIG. 2 shows the longitudinal strips 22 in a pre-assembly condition. As shown in FIG. 3, before the wiper device 20 is assembled, opposite lateral edges of the longitudinal strips 22 are cut to present two pairs of tabs 36a, 36b (or tangs) which are over-bent (plastically deformed) such that they project vertically downwardly below the surrounding portions of the longitudinal strips 22 when in a resting condition. As shown, the tabs 36a, 36b are spaced apart from one another and extend longitudinally towards one another to respective distal ends that are spaced from one another by a first distance. The cuts in the longitudinal strips are generally L-shaped and open to the respective lateral edge and may be formed through a punching operation. In the exemplary embodiment, each of the two longitudinal strips 22 has a pair of tabs 36a, 36b, and the pairs of tabs 36a, 36b are generally aligned with one another in the longitudinal direction. For reasons discussed in further detail below, one pair of the tabs 36a are hereinafter referred to as "leading tabs" and two of the tabs 36b are hereinafter referred to as "trailing tabs".

Figure 9:
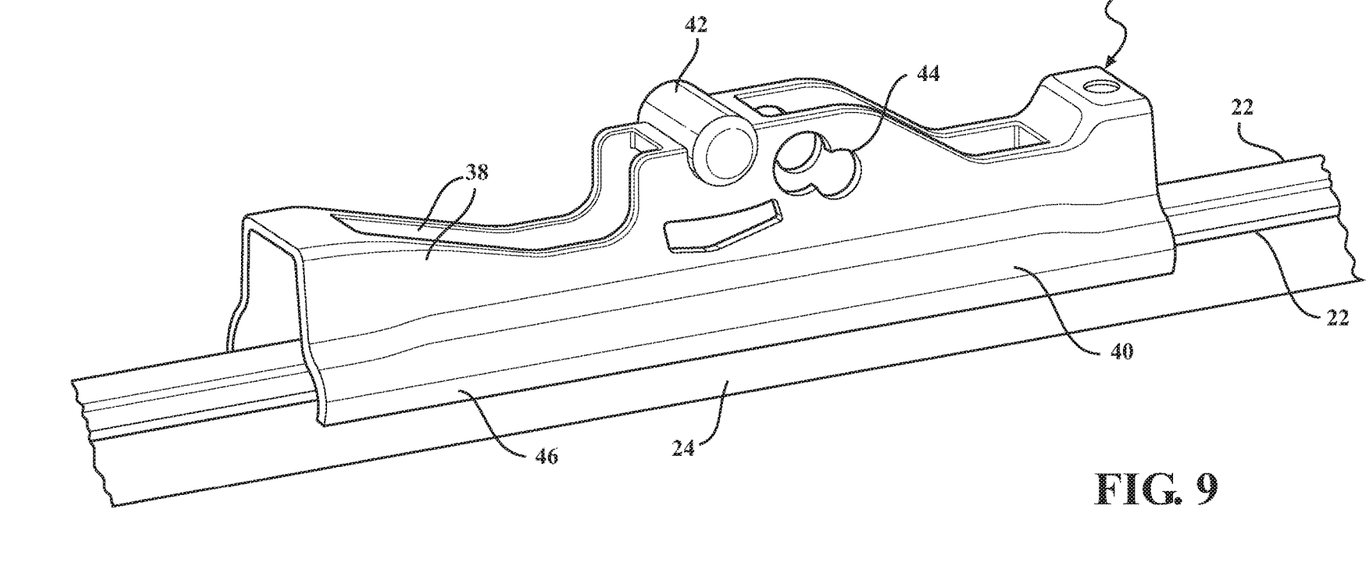
FIG. 9 is a perspective view showing the base in engagement with the carrier element.
Figure 10:
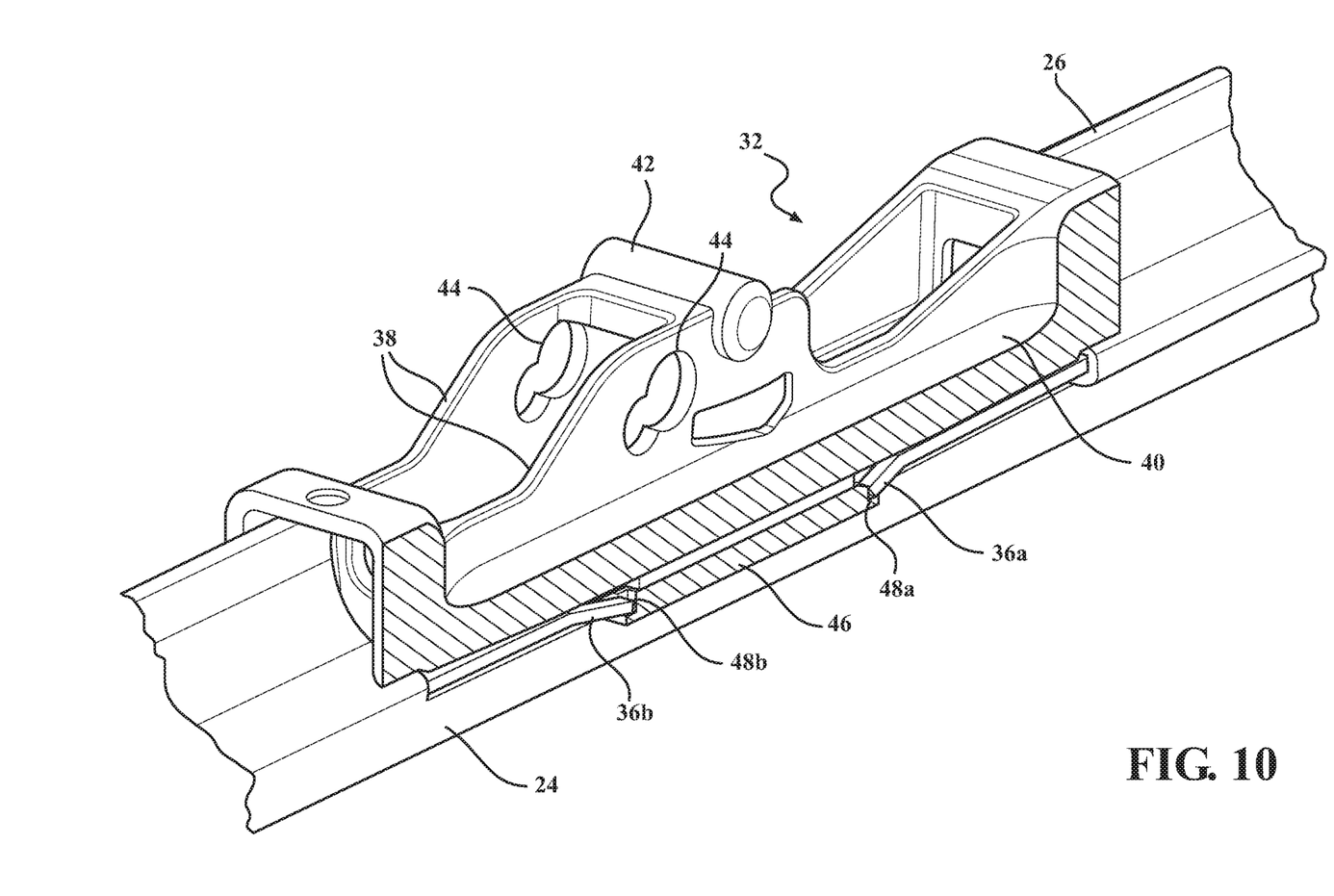
FIG. 10 is a perspective and sectional view of the base in engagement with the longitudinal strip and with a pair of sub-spoilers also attached with the at least one longitudinal strip.

Referring now to FIG. 9, the base 32 of the connecting device 28 has a pair of side walls 38 which upwardly form a bottom wall 40 and are spaced from one another in a lateral direction. The side walls 38 support a cylindrical pin 42 which protrudes past the opposite side walls for receiving the openings in the joint part 34 (shown in FIG. 1) and includes aligned windows 44 for receiving a side pin of a side pin-style wiper arm (not shown). The base 32 also presents a pair of arms 46 which extend from the bottom wall 40 to wrap around the opposite lateral edges of the longitudinal strips 22 and engage respective lower surfaces of the longitudinal strips 22 and retain the base 32 with the strips 22. A gap between the bottom wall 40 and lower portions of the arms 42 allows the base 32 to be slid onto the longitudinal strips 22 during assembly of the windscreen wiper device 20.

Figure 5:
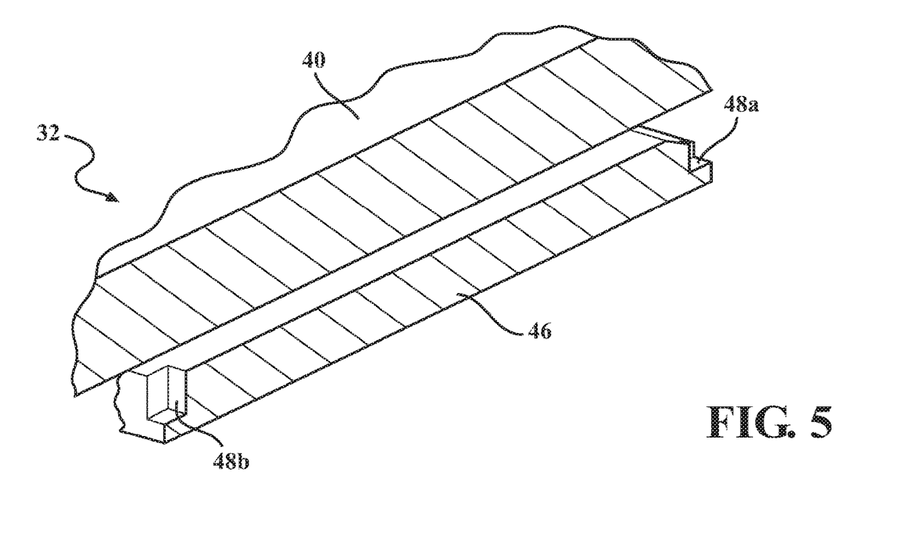
FIG. 5 is an enlarged view of a portion of the base of FIG. 4.
Figure 7:
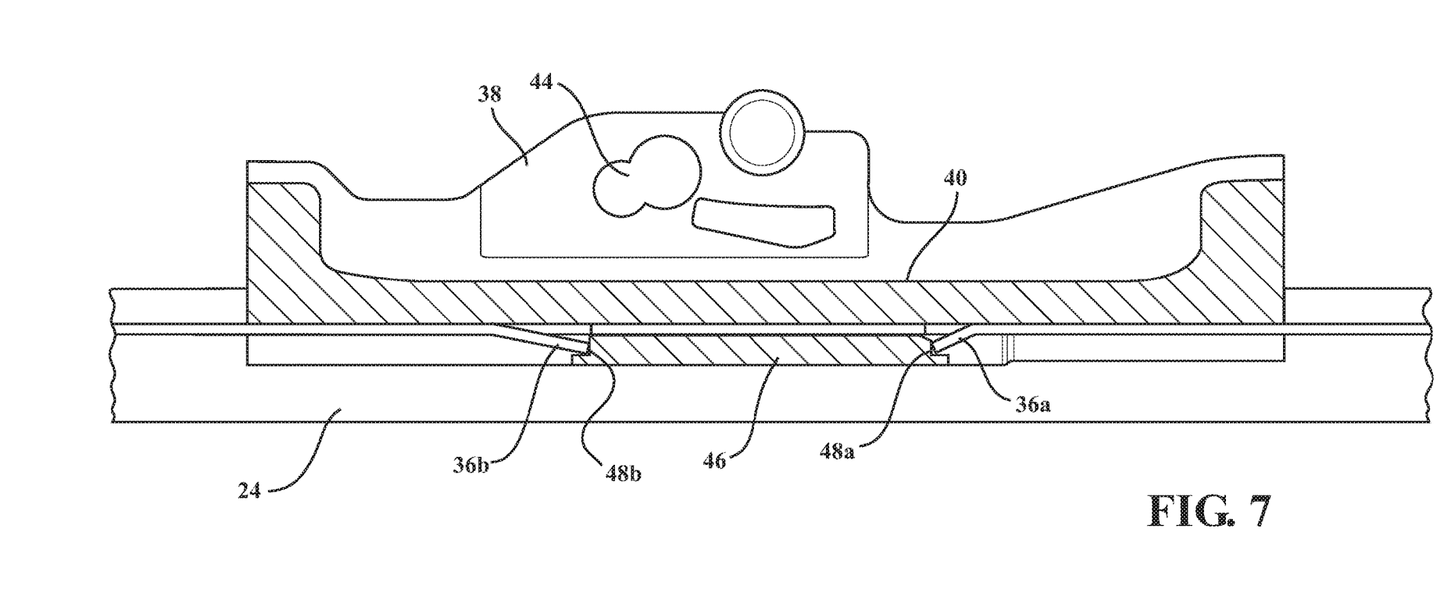
FIG. 7 a cross-sectional view of the base of FIG. 4 being lockingly connected with the carrier element of FIG. 3.
Figure 8:
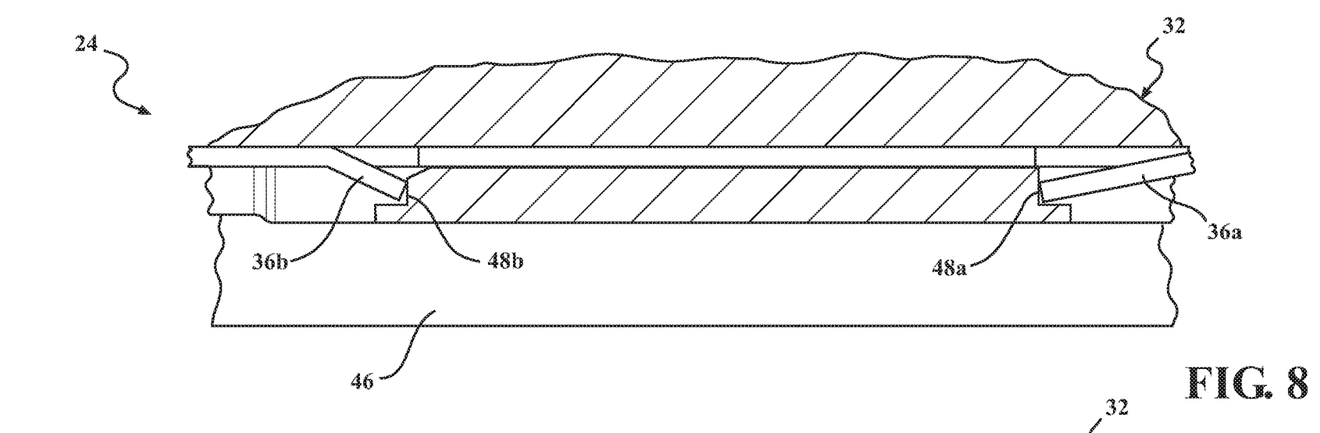
FIG. 8 is an enlarged view of a portion of FIG. 7.

As shown in FIG. 5, one of the arms 40 is partially removed to show the lower portion of the respective arm 40. As shown, each longitudinal end of the lower portion is provided with a box-shaped notch 48a, 48b or cutout. As shown in FIG. 7, the notches 48a, 48b are spaced from one another by the same first distance as the distal ends of the tabs 36a, 36b such that, when the base 32 is connected with the longitudinal strips 22, the tabs 36a, 36b are received in the notches 48a, 48b.

Another aspect of the present invention is related to a method of making a windscreen wiper device 20 such as the windscreen wiper device 20 shown in FIG. 1. Referring to FIG. 2, the exemplary method starts with the pair of longitudinal strips 22 which are pre-curved to have a curved shape when in a relaxed condition. Each of the longitudinal strips 22 extends in a longitudinal direction between opposite longitudinal ends.

Referring now to FIG. 3, each of the longitudinal strips 22 is cut to present the pair of tabs 36a, 36b which extend longitudinally towards one another. The tabs 36a, 36b are bent downwardly such that each tab 36a, 36b projects below the bottom of the surrounding portion of the associated longitudinal strip 22.

Next, the longitudinal strips 22 are inserted into opposite laterally facing grooves in an elastomeric wiper blade 24 to support the wiper blade 24 and to bias the wiper blade 24 into the curved shape.

Figure 6:
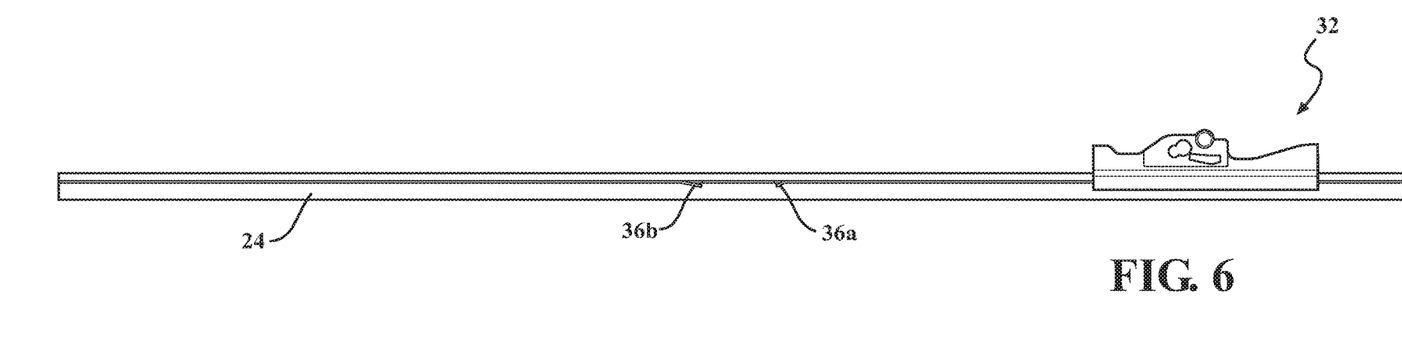
FIG. 6 is a front elevation and sectional view of the base of FIG. 4 being slid onto the carrier element of FIG. 3.

As shown in FIG. 6, the base 32 is slid onto neighboring ends of the longitudinal strip 22 and is slid towards the tabs 36a, 36b. The base 32 is slid until the lower portions of the arms 46 encounter angled surfaces of the leading tabs 36a to resiliently deflect and flatten the leading tabs 36a. As shown in FIG. 7, the base 32 is slid until the trailing tabs 36b encounter the notches 48b in the lower portions of the arms 46. Since the distance between the ends of the ends of the tabs 36a, 36b is similar to the distance between the notches 48a, 48b, at this point, the deflected leading tabs 36a automatically spring into engagement with the other notches 48a. Together, the set of engaged leading tabs 36a and notches 48a and the set of trailing tabs 36b and notches 48b serve to lock the base 32 against removal from the longitudinal strips 22 and in position to receive the joint part 34 (shown in FIG. 1). The gaps between the tabs 36a, 36b and the associated notches 48a, 48b are preferably kept to an absolute minimum while still allowing the leading tabs 36a to resiliently spring downwardly during the connecting operation in order to limit longitudinal movement of the base 32 relative to the longitudinal strips 22. Since the notches 48a, 48b are formed into upper surfaces of the lower portions of the arms 46, in this locked condition, the tabs 36a, 36b are not readily accessible, and thus, the connection between the longitudinal strips 22 and the base 32 is non-detachable, i.e., permanent. Because the tabs 36a, 36b are similar to one another, the base 32 can be slid onto either end of the longitudinal strips 22.

With the base 32 in place, the sub-spoilers 26 are then slid onto opposite ends of the longitudinal strips 22 until the sub-spoilers 26 contact the base 32. Then, the end caps 30 are connected with neighboring ends of the longitudinal strips 22 to trap the sub-spoilers 26 between the base 32 and the end caps 30. The joint part 34 is then connected with the base 32.

The entire assembly process is may be carried out very quickly and easily and requires no adhesives, welding, soldering or other bonding operations that are required to assemble other known windscreen wiper devices.

Obviously, many modifications and variations of the present invention are possible in light of the above teachings. It is, therefore, to be understood that within the scope of the appended claims, the invention may be practiced otherwise than specifically described. It should also be appreciated that the directional terms used herein, such as "upper", "lower" and "bottom", are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A windscreen wiper device, comprising:
a wiper blade made of an elastomeric material and extending in a longitudinal direction;
at least one longitudinal strip that is pre-curved to have a curved shape when in a relaxed condition and said at least one longitudinal strip being operably attached with said wiper blade and biasing said wiper blade into a curved shape;
a connecting device secured with said at least one longitudinal strip;
said at least one longitudinal strip including a pair of elongated, flexible tabs extending longitudinally from a fixed end to a free end thereof, towards one another and projecting vertically; and
said flexible tabs on said longitudinal strips operable for flexing and cooperating with said connecting device to secure said connecting device with said at least one longitudinal strip;
wherein said connecting device includes a base with a pair of notches that receive said flexible tabs of said at least on longitudinal strip.

2. The windscreen wiper device as set forth in claim 1 wherein said tabs are bent downwardly from a surrounding portion of said at least one longitudinal strip, wherein a gap is formed between each one of said tabs and said surrounding portion of said strip.

3. The windscreen wiper device as set forth in claim 2 wherein said tabs are partially delimited by cuts in said at least one longitudinal strip which forms said gap between each one of said tabs and said surrounding portion of said strip to allow said tabs to flex relative to said strip.

4. The windscreen wiper device as set forth in claim 2 wherein said at least one longitudinal strip is a pair of longitudinal strips that are received in laterally outwardly facing grooves of said wiper blade.

5. The windscreen wiper device as set forth in claim 4 wherein each of said longitudinal strips has a pair of tabs each extending to a distal end and extending longitudinally towards one another and defining a space therebetween.

6. The windscreen wiper device as set forth in claim 5 wherein said longitudinal strips have opposing lateral edges and wherein said tabs are formed into said opposing lateral edges.

7. The windscreen wiper device as set forth in claim 1 wherein said notches of said base are formed on an arm that wraps around said at least one longitudinal strip such that said base is non-detachable from said at least one longitudinal strip.

8. The windscreen wiper device as set forth in claim 1 wherein said connecting device includes a joint part which is pivotably connected with said base.

* * * * *